United States Patent [19]

Herchenbach et al.

[11] 4,126,471

[45] Nov. 21, 1978

[54] METHOD AND APPARATUS FOR THE THERMAL TREATMENT OF ALKALI-CONTAINING PULVERIZED RAW MATERIAL TO BE USED IN THE MANUFACTURE OF CEMENT

[75] Inventors: Horst Herchenbach, Troisdorf; Hubert Ramesohl, Bergisch Gladbach; Rudolf Kuhs, Lohmar; Kurt Schneider, Cologne, all of Germany

[73] Assignee: Klöckner-Humboldt-Deutz Aktiengesellschaft, Germany

[21] Appl. No.: 814,735

[22] Filed: Jul. 11, 1977

[30] Foreign Application Priority Data

Jul. 9, 1976 [DE] Fed. Rep. of Germany ....... 2630907

[51] Int. Cl.$^2$ ............................................... C04B 7/44
[52] U.S. Cl. .................................................... 106/100
[58] Field of Search ......................................... 106/100

[56] References Cited

U.S. PATENT DOCUMENTS

| 3,451,665 | 6/1969 | Strassen | 106/100 |
| 3,887,388 | 6/1975 | Christiansen | 106/100 |
| 3,923,536 | 12/1975 | Kobayashi | 106/100 |

*Primary Examiner*—James Poer
*Attorney, Agent, or Firm*—Hill, Gross, Simpson, Van Santen, Steadman, Chiara & Simpson

[57] ABSTRACT

A method and apparatus for the thermal treatment of alkali-containing pulverent raw material used in the manufacture of cement in which the material is preheated in a preheater and after sintering in a furnace is conveyed to a cooler. Alkali free exhaust air from the cooler is conveyed into the preheater for heating the material and the alkali-containing furnace exhaust gases are cooled by means of adding a portion of the pulverized raw material to them in a heat exchanger. The alkali salts are condensed and are separated off in a dust collecting chamber.

9 Claims, 3 Drawing Figures

METHOD AND APPARATUS FOR THE THERMAL TREATMENT OF ALKALI-CONTAINING PULVERIZED RAW MATERIAL TO BE USED IN THE MANUFACTURE OF CEMENT

BACKGROUND OF THE INVENTION

1. Field of the Invention

This invention is in the field of thermal treatment of alkali-containing pulverent raw material used in the manufacture of cement to achieve minimum heat losses and to produce calcined products of controlled alkali content despite variations in alkali content in the raw material.

2. DESCRIPTION OF THE PRIOR ART

It is known in cement chemistry and cement technology to control the alkali content in cement when such content is unfavorable. Alkali combinations in the cement may appreciably shorten the cement solidification time and bring about a breakdown or reversal of the cement. Too high an alkali content may lead to efflorescence of alkali sulfates in the concrete. Then, too, a high alkali content may result in reaction of the alkali material with additives to cause an alkali expansion of the cement and endanger the constancy of volume of the concrete.

When pulverent raw material to be used in the manufacture of cement is calcined, the alkali chlorides are volatilized quantitatively in the calcining furnace and are conveyed off as vapors or by condensation as a fine mist with the furnace exhaust gas. If the alkali materials in the exhaust gas reach the preheater, they are conveyed back into the calcining furnace in combination with the heated raw material. The furnace exhaust gas is thereby constantly enriched with alkali and the raw material is consistently being increased in its alkali content progressively. Consequently, the pulverent raw material used in the manufacture of cement is appreciably impaired with regard to its fusibility and it may result in a caking or clogging of material within the preheater.

In U.S. Pat. No. 3,235,239 there is described a method for the calcining of alkali-containing pulverent raw material to be used in the manufacture of cement in which the preheating of the pulverent raw material takes place in a preheater with alkali-free exhaust air from the cooler in a separate combustion chamber. The alkalies volatilized in the sintering furnace are partially displaced and partially conveyed into the combustion chamber so that as the operating time increases, an alkali circulation is built up in the installation. With very large cement production installations, however, it is not economical to completely displace or abandon the alkali-containing furnace exhaust gases without making use of their heat content since the cost of cement production particularly with present day high energy costs becomes very high.

In German Pat. No. 1,471,115 there is described a method for the production of a low alkali cement from calcite or limestone containing pulverent raw material in which the raw material is calcined with an alkali free exhaust gas from a cooler in a preheater during addition of fuel and is sintered in a calcining furance. The alkali containing exhaust gases of the sintering furnace are cooled by means of preheating of at least a portion of the raw material. The alkali salts condense through the cooling of the furnace exhaust gases and are removed in a dust removal installation. With this method, a low alkali cement can be produced from alkali containing pulverent raw material without substantial loss of heat, if it is possible to prevent a substantial precipitation of alkali materials in the heat exchanger on the pulverent raw material. However, in practice it is difficult to accomplish this result with high alkali contents, particularly with direct heat exchange.

SUMMARY OF THE INVENTION

The present invention provides an improvement in the method for the thermal treatment of alkali-containing pulverent raw materials in the manufacture of cement, whereby the materials are treated with minimum heat losses and without danger of circulation of alkali. The equipment involved can be provided at low investment costs. It is also possible to adjust the alkali content in the finished calcined produces despite fluctuating alkali contents in the raw material, to hold the contents at predetermined permissible values.

In accordance with the present invention, a partial stream from the furnace exhaust gases containing alkali being supplied to the heat exchanger is branched off before the heat exchanger and bypasses the same. This partial stream is removed from the system after dust is removed from it. With this arrangement, despite changing alkali contents in a starting material, an approximately constant alkali content will be achieved in the cement clinker, as the undesired high quantity of alkali volatilized in the sintering furnace may be conveyed out of the system and only that quantity of alkali-containing furnace exhaust gas is supplied to the heat exchanger which will provide the permissive predetermined alkali content in the cement clinker. The heat losses per kilogram of calcined cement clinker may in this way be substantially lowered.

In the preferred form of the invention, the alkali-containing furnace exhaust gases are conveyed to the heat exchanger where they give off their heat to a pulverent raw material used in the manufacture of cement and present in suspended form. Through the direct contact of the hot furnace exhaust gases with the pulverent raw material, a very good heat transfer from the furnace exhaust gases to the pulverent raw material is obtained. The alkali materials are strongly cooled in the heat exchanger by means of the pulverent raw materials so that they condense in the furnace exhaust gas and may be drawn off out of the heat exchanger to a substantial extent in the form of a mist at a temperature of about 800° to 900° C. The pulverent raw material because of the spontaneous heat intake is calcined and is drawn off out of the heat exchanger.

In a further embodiment of the invention, the partial stream of the alkali-containing furnace exhaust gases is cooled by means of fresh air and/or water and/or pulverent cement raw materail. By these means, a rapid cooling of the hot partial gas stream is obtained so that the alkali salts condense and are stabilized by means of the cooling to be separated in the dust removal installation. Caking of the material in the partial stream branch conduit is completely prevented. By the addition of finely divided pulverent raw material, the dust resistance values are favorably modified so that the electrical precipitator can operate in the optimum range and a substantial dust removal is insured.

In the preferred embodiment of the invention, the amount of the partial stream and/or the portion of the pulverent raw material which is introduced into the stream of furnace exhaust gas is so adjusted that the total quantity of alkali introduced into the sintering furnace with the heated pulverent raw material remains below a predetermined limit. By the adjustment of the particular quantity relation of the alkali containing partial stream to the alkali containing stream of exhaust gas conveyed to the heat exchanger, it is possible even at variably high alkali contents to adjust to a constant low alkali content in the cement clinker when it is calcined. It is also possible to vary concurrently with the adjustment of the gas-quantity ratio or separately therefrom the quantity of pulverent raw material to be used in the manufacture of the cement to be conveyed to the heat exchanger so that despite rising alkali content in the furnace exhaust gas, less alkali material reaches the sintering furnace.

In accordance with a preferred embodiment of the invention, the pulverent raw material to be used in the manufacture of cement passes directly from the heat exchanger into the sintering furnace. This is advantageous particularly when the pulverent material when treated by the furnace exhaust gas is calcined in the heat exchanger to such an extent that a return into the preheater is not economical. It is, however, also possible to use a preheater with several cyclone steps arranged in superimposed relation and to introduce the pulverent raw material drawn off the heat exchanger, together with the pulverent raw material which is preheated in the preheater into the lowermost cyclone step. This is particularly advantageous when the pulverent raw material drawn out of the heat exchanger is only partially calcined so that a further calcination, together with the pulverent raw material supplied to the preheater may be carried out in the lowermost cyclone step if necessary by means of separate fuel addition. The entire pulverent raw material preheated in this manner then leaves the lowermost cyclone step of the preheater into the sintering furnace.

In a further embodiment of the invention, at least a partial quantity of the preheated pulverent raw material is conveyed out of the next higher cyclone into the discharge end of the heat exchanger, and the combined pulverent raw material is conveyed to the lowermost cyclone step of the preheater. Generally, the danger exists with a furnace exhaust gas very high in alkali and a raw material high in alkali that adhesions and deposits may occur in the discharge conduit of the heat exchanger. In our invention, however, the mixing of the two streams of pulverent raw material results in no adhesion nor deposit in the discharge conduit of the heat exchanger.

The invention also provides an apparatus for carrying out the method, including a sintering furnace, a preheater connected in series for receiving the pulverent raw material to be used and a cooler for sintering material connected with the exhaust air side of the preheater. The sintering furnace is connected through an exhaust gas conduit with a supply device for a portion of the pulverent raw material and a heat exchanger and a dust removal installation. There is further provided a branch conduit from the exhaust gas conduit of the sintering furnace for the heat exchanger which bypasses the heat exchanger and preferably goes to the dust removal installation such as an electrostatic precipitator. By means of this system, when the alkali content rises in the starting material, a predetermined quantity of alkali containing furnace exhaust gas is supplied to the heat exchanger and a partial stream is displaced so that the quantity of alkali remaining in the system may be adjusted to predetermined limits. The discharge of the branch conduit preferably occurs in front of the supply device for the pulverent raw material so that the added or supplied pulverent material comes in contact solely with a partial quantity of alkali containing furnace exhaust gases.

In a further embodiment of the invention, there is provided a material distributor beneath the supply device for the pulverent raw material. In addition, the heat exchanger is a cyclone separator. This combination provides a particularly simple means for securing an optimum suspension of pulverent raw material in the furnace exhaust gases, and an optimum heat transfer of the heat content of the gases to the particles. A high degree of separation of pulverent raw material from the alkali-containing exhaust gases is insured. The furnace exhaust gases coming out of the heat exchanger are preferably cooled directly upon their exit from the heat exchanger so that the still mist-like alkalies present condense further and are separated as solids in the dust removal device. Only a small part of the alkalies collect on the finely divided particles of pulverent raw material and leave the cyclone separator through its discharge conduit. In this way, it is possible to treat a pulverent raw material with very high alkali content fuel gases, making use of the full heat content of such gases so that the preheated pulverent material has a predetermined alkali content which is volatilized quantitatively in the sintering furnace. A cement clinker with very low alkali content is thus produced. The dust forced out of the cyclone separator improves the dust resistance values, so that despite a high proportion of alkali dust in the exhaust gas, an optimum separating effect can be obtained in the electrical dust removal installation.

In a further embodiment of the invention, adjustable valves are provided in the furnace exhaust gas conduit and in the branch conduit. Thus it is possible to adjust the ratio of partial stream to the exhaust gases supplied to the heat exchanger so that even with an increase in the alkali content of the starting material, higher alkali values need not appear in the cement clinker when calcined.

In another preferred embodiment of the invention, the furnace exhaust gas conduit and the branch conduit discharge directly out of the furnace inlet manifold and in each case have separate locking members. This is an advantage when the inlet manifold is such that an uncontrolled quantity of spray material is being carried along by the furnace exhaust gases. In accordance with this invention, the branch conduit is arranged so that the spray material reaches only into the furnace exhaust conduit leading to the heat exchanger and is conveyed back together with the supplied pulverent raw material into the stream. An excessive occurrence of dust for removal by the dust removal equipment is thus prevented.

Additional features of the invention will be explained in greater detail in the following description of preferred embodiments by way of example.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

Figure 1:
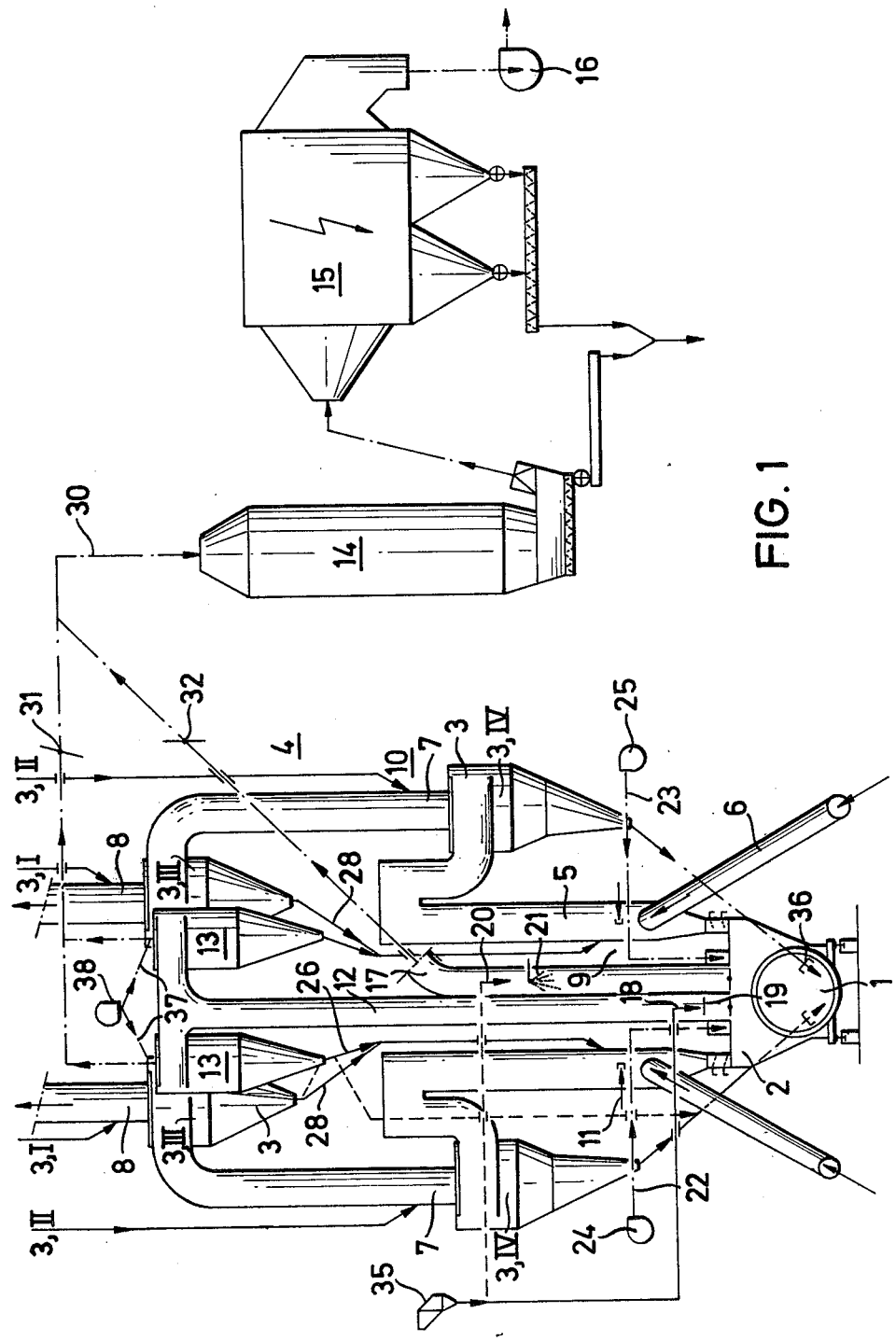
FIG. 1 is a diagrammatic showing of an installation for cement production carrying out the method of the present invention with two parallel suspension gas preheaters consisting of several cyclones.
Figure 2:
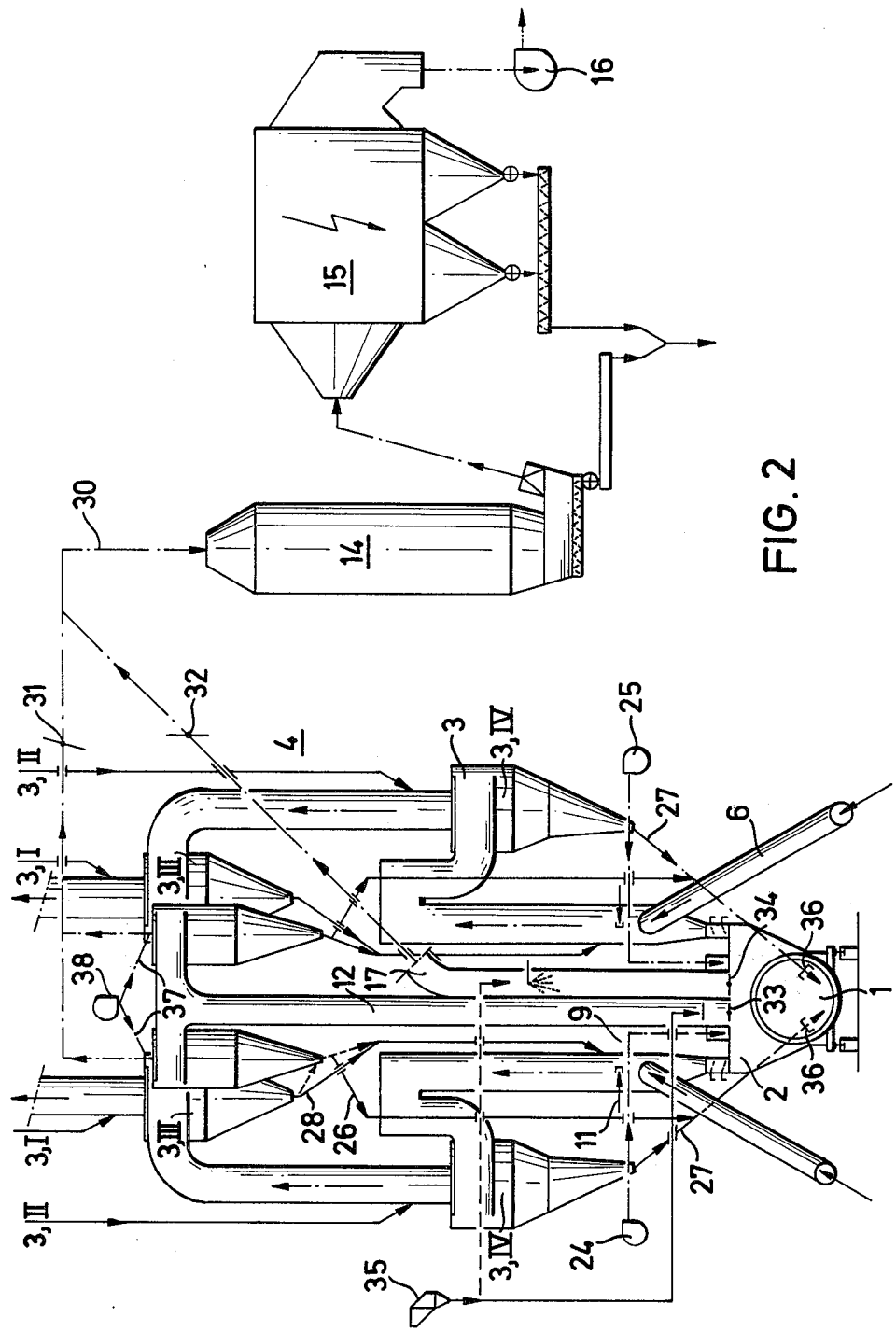
FIG. 2 is a modified form of the system shown in FIG. 1.
Figure 3:
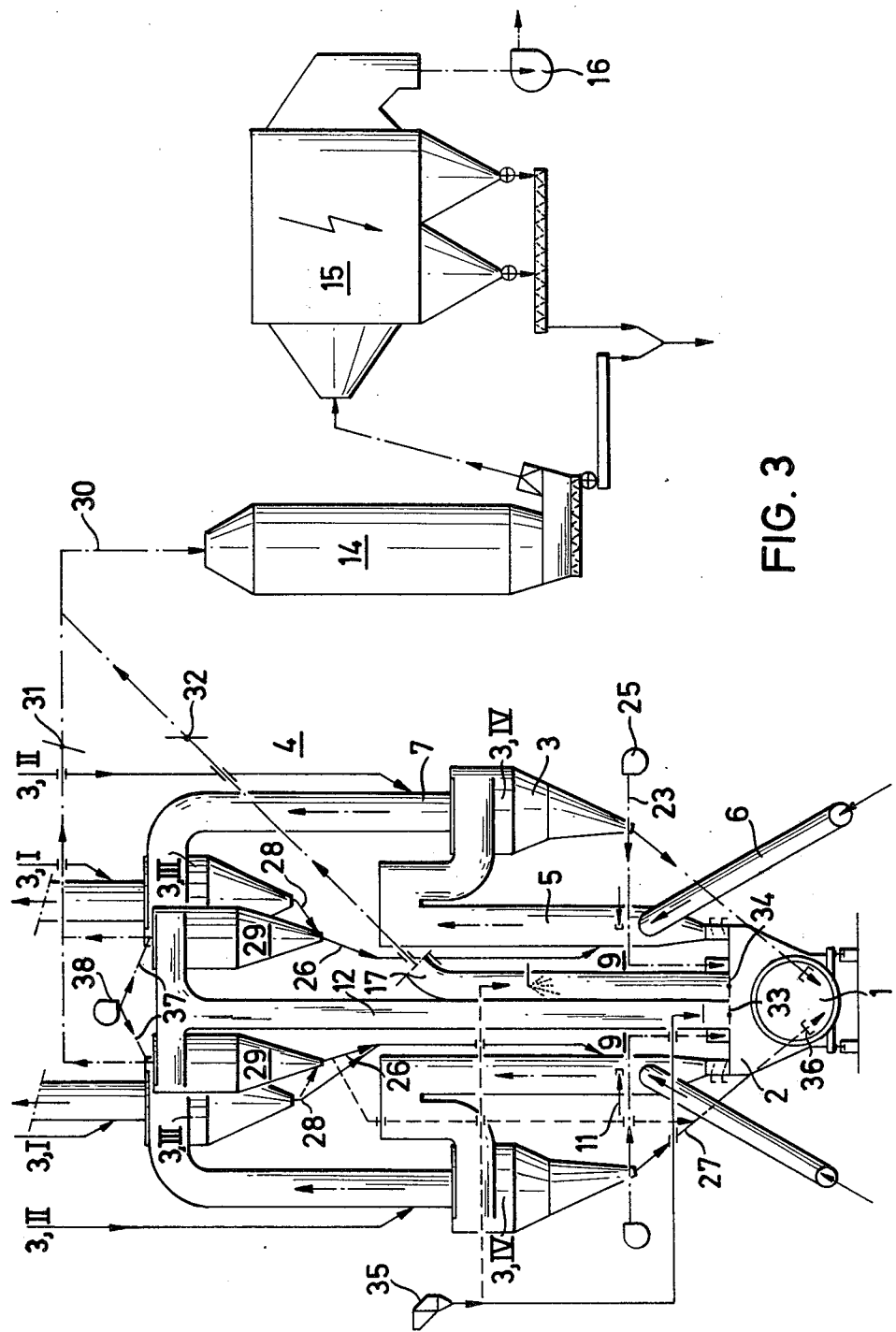
FIG. 3 shows a further modification of the system shown in FIG. 1.

The installations shown diagrammatically in FIGS. 1 to 3 consist of partial views for the thermal treatment of alkali containing pulverent raw material used in the manufacture of cement. The systems include a rotary kiln 1 with an inlet manifold 2 and two parallel suspension gas preheaters 4 consisting of several cyclones 3 arranged in superimposed relation. In the uptake or feed pipe 5 leading to the lowermost cyclone 3, IV of one of the suspension gas preheaters 4 is connected a cooler exhaust air conduit 6 which is connected with a sintered material cooler, not shown in detail, for the pulverization of raw materials to be used in the manufacture of cement burnt to completion in the rotary kiln 1. The cyclones 3 of one of each of the suspension gas preheaters 4 are connected by means of gas conduits 7,8 with one another in such a manner that the hot gases of the lowermost cyclone 3, IV, by means of a blower (not shown) are directed through the individual cyclones of the suspension gas preheater 4. On the material side, the cyclones 3 of the suspension gas preheater 4 are so connected with one another that the pulverent raw materials delivered to the preheaters are supplied in countercurrent relationship to the rising hot gases at 9,10 in the gas conduits 5,7 leading to the cyclones 3, IV and 3, III. The flow of material and hot gases in the suspension gas preheaters is indicated by different arrows. The reference characters 3, I to 3, IV likewise illustrate only diagrammatically the material discharge from the particular cyclone step. The pulverent raw material is supplied in the uptake or feed pipe at 9 leading to the cyclone 3, IV, and is calcined in suspension by means of combustion devices 11. The dust discharge pipe of the cyclone 3, IV, is in each case connected with the furnace inlet manifold 2.

On the exhaust gas side, the rotary kiln 1 is connected through the furnace inlet manifold 2 with a furnace exhaust gas conduit 12 which is directed to two heat exchangers 13, the heat exchangers being cyclone separators. These separators are, in turn, connected through a gas conduit 30 with a spray tower 14, an electrofilter 15 such as an electrical precipitator, and an induced draft blower 16 connected in series. In the portion of the gas conduit 30, leading from the cyclone separator 13 to the spray tower 14 there are provided fresh air conduits 37 which are supplied by a blower 38 and discharge directly behind the cyclone separators in the gas conduit. Directly adjacent to the exhaust gas conduit there is a branch conduit 17 which bypasses the heat exchanger 13 and is connected to the spray tower 14 and the electrofilter 15.

The discharge conduits 26 of the heat exchanger are connected to the material discharge pipe 28 of the next higher cyclone separator 3, III, of the suspension gas preheaters 4 which in turn are connected to the lowermost cyclone steps 3, IV at reference numeral 9.

The furnace exhaust gas conduit 12 includes a supply device 18 for pulverent raw material to be used in the manufacture of cement, and below the supply device there is located a deflecting plate 19. In the branch conduit 17 there is similarly a supply device 20 for pulverent raw material and a water spraying device 21. In the discharge conduit 12 and in the branch conduit 17 extending from the manifold 2, there are provided fresh air conduits 22 and 23 which are connected to fresh air blowers 24 and 25, respectively.

The installation shown in FIG. 2 differs from that shown in FIG. 1 in that the discharge conduit 26 of the heat exchanger 13 is in connection with the discharge pipes 27 of the lowermost cyclones 3, IV, of the suspension gas preheater 4.

The installation shown in FIG. 3 differs from that shown in FIG. 1 in that the material discharge pipe 28 of the next higher cyclone step 3, III, of the suspension gas preheater 4 is connected to the discharge side 29 of the heat exchanger 13 and the discharge conduit 26 of the heat exchanger discharges at 9 in the uptake or feedpipe 5 leading to the lowermost cyclone 3, IV.

Through a series of blocking members of known construction, not shown in detail, in the material discharge pipe 28 of the cyclone step 3, III, of the suspension gas preheater as well as in the discharge conduits 26 of the heat exchanger, the material transfer shown in FIGS. 1 to 3 between the suspension gas preheater 4, heat exchanger 13, and rotary kiln 1 may be carried out in a single installation so that an optimum adjustment of the installation is possible in any type of operation.

In the gas conduit 30 leading to the spray tower 14 and in the branch conduit 17 there are regulating valves 31,32 for the adjustment of the relative amounts of exhaust gases in those conduits. Opposite the furnace inlet manifold 2, the furnace exhaust gas conduit 12 and the branch conduit 17 are provided with blocking members or baffles 33 and 34.

The manner of operation of the installations is summarized as follows. The pulverent raw material is preheated in the individual cyclone steps 3,I; 3,II; and 3,III; and then passes into the feed pipe 5 where it is mixed with alkali free exhaust air from a cooler exhaust conduit 6. The raw material is subjected in the feed pipe with the aid of combustion devices 11 to a separate calcining process and after a significant calcination has been effected, it is separated from the lowermost cyclone step 3, IV, and introduced in the rotary kiln 1. In the kiln 1, the alkali contained in the pulverent raw material is volatilized quantitatively and together with the furnace exhaust gas passes through the furnace exhaust conduit 12.

To economically recover the heat content of the furnace exhaust gases, they are supplied through the conduit 12 to the heat exchangers 13. Approximately 10 to 15% of the total pulverent raw material supplied to the installation is introduced by means of a supply device 18 into the exhaust gas conduit 12 from a storage container 35. In order to obtain good heat transfer, the pulverent raw material is suspended with the aid of the deflecting plate 19 in the exhaust gas conduit 12 and rises with the exhaust gases to the cyclone heat exchangers 13. There, the particles are separated from the gas and together with the pulverent raw material, already preheated to a substantial extent, is introduced from the cyclones 3, III, of the gas preheater 4 into the lowermost cyclone step 3, IV. The hot gases issuing from the heat exchangers 13 which contain substantial amounts of alkali present in mist form are cooled with fresh air through a blower 38 and the fresh air conduit 37 so that the alkalies may be conveyed along in dust form by the gases to the electrofilter 15. Agglomerates in the gas conduit 30, particularly on the heat exchanger outlet, are prevented.

If the alkali content in the exhaust gases should increase because of an increased alkali content in the starting materials, then a partial stream of the alkali containing furnace exhaust gases is taken off through the branch conduit 17 with the aid of the regulating valves 31 and 32. This fraction is removed with bypassing of the heat exchanger and flows through the spray tower 14 and the electrofilter 15 whereupon it is removed from the system. To keep the branch conduit 17 free from adherent alkali deposits, a fresh air blower introduces air through the conduit 23 so that the alkalies condense early and may be conveyed off as alkali salts with the furnace exhaust gases. The condensation of the alkalies may be enhanced by the introduction of atomized water which is introduced through the spray device 21 in the branch conduit 17. It is also advantageous to enhance the condensation of the alkalies in the gases of the branch conduit 17 by adding pulverent raw material so that the dust resistance of values in the particles are more favorable for separation in the electrofilter 15. The enrichment of the furnace exhaust gases with pulverent raw material may also take place through the adjustable reflectors 36 in the discharge pipes 27 to improve the dust resistance values.

The alkali containing furnace exhaust gases in the furnace gas conduit 12 being supplied to the heat exchangers 13 may be cooled by means of fresh air through the fresh air conduit 22 and the blower 24, thereby accelerating condensation of alkali.

If it should be found that the particles of pulverent raw material are already sufficiently calcined, and the additional heat treatment in the lowermost cyclone step 3, IV, of the preheater 4 becomes superfluous, then this portion of raw material can be supplied with the pulverent raw material discharged from the step through the discharge pipe 27 directly into the rotary kiln as shown in FIG. 2. If, on the other hand, the alkali content in the furnace exhaust gases rises substantially because of the change of alkali content in the starting materials, and the danger exists that the discharge conduit 26 of the heat exchanger will be clogged because of deposited alkali, then the raw material for cement manufacture drawn out of the next higher cyclone step 3, III, can be directed into the discharge end 29 of the heat exchanger 13 and the total quantity of raw material conveyed through the discharge conduit 26 for further thermal treatment in the lowermost cyclone step 3, IV, of the preheater 4 (FIG. 3).

The method described for the thermal treatment of raw material to be used in the manufacture of cement with a high alkali content is not limited to the embodiment shown by way of example where two parallel suspension gas preheaters are combined with centrally disposed heat exchangers, but the process can also be used with an installation containing only one suspension gas preheater and one or more correlated heat exchangers.

It should be evident that various modifications can be made to the described embodiments without departing from the scope of the present invention.

We claim as our invention:

1. In a method for the thermal treatment of alkali-containing raw material for the manufacture of cement in which said raw material is preheated in a preheater, sintered in a furnace, and cooled in a material cooler and wherein an alkali-free exhaust from said cooler is conveyed to said preheater for preheating said raw material and alkali-containing exhaust gases from said furnace are contacted with a portion of said raw material in a heat exchanger to condense alkali salts thereon, the improvement which comprises:

diverting a portion of said alkali-containing exhaust gases prior to said heat exchanger,
removing dust from the diverted portion, and
removing the dust-free portion from the system.

2. A method according to claim 1 in which said portion is cooled prior to precipitating dust therefrom.

3. A method according to claim 1 in which said alkali-containing exhaust gases suspend said portion of raw material in said heat exchanger.

4. A method according to claim 1 in which the portion of raw material combined with the alkali-containing exhaust gases constitutes from 5 to 25% of the total quantity of said raw material being treated.

5. A method according to claim 1 which includes the step of cooling said alkali-containing gases with fresh air before directing the same into said heat exchanger.

6. A method according to claim 1 in which the gases issuing from said heat exchanger are cooled directly as they issue therefrom.

7. A method according to claim 1 in which the solid material issuing from said heat exchanger is passed directly into said sintering zone.

8. A method according to claim 1 in which the solid material issuing from said heat exchanger together with the raw material treated in said preheating zone are passed as a suspension through a sequential series of cyclone stages.

9. A method according to claim 8 in which at least a portion of the preheated raw material from one of the intermediate cyclone stages is passed into the discharge end of said heat exchanger and the combined materials from said heat exchanger are passed into the first cyclone stage.

* * * * *